(12) United States Patent
Waggoner et al.

(10) Patent No.: US 9,795,242 B2
(45) Date of Patent: Oct. 24, 2017

(54) ADDITIVE DELIVERY SYSTEMS AND CONTAINERS

(71) Applicant: Samsara Bottle System, Inc., Sarasota, FL (US)

(72) Inventors: Garrett S. Waggoner, Sarasota, FL (US); Andrew Gay, Mill Creek, WA (US); Christopher Jasperse, Pittsburch, KS (US)

(73) Assignee: Cirkul, Inc., Sarasota, FL (US)

( * ) Notice: Subject to any disclaimer, the term of this patent is extended or adjusted under 35 U.S.C. 154(b) by 402 days.

(21) Appl. No.: 14/181,354

(22) Filed: Feb. 14, 2014

(65) Prior Publication Data

US 2014/0230659 A1    Aug. 21, 2014

Related U.S. Application Data

(60) Provisional application No. 61/764,861, filed on Feb. 14, 2013.

(51) Int. Cl.
*A47J 31/00* (2006.01)
*B67D 1/00* (2006.01)

(52) U.S. Cl.
CPC .................................. *A47J 31/005* (2013.01)

(58) Field of Classification Search
CPC ...................................................... A47J 31/005
USPC ...... 222/80, 81, 83, 83.5, 145.1, 145.5, 522, 222/523, 524, 525, 79, 145.6, 567, 630, 222/637; 426/115, 590, 519, 565, 566, 426/567, 130, 120; 206/219, 220; 220/501, 212, 90.2, 90.4, 90.6, 85 R, 220/4.26, 4.27, 23.86, 23.83, 505, 521, 220/524, 568, 903; 215/6, 1 R, 1 A, 227, 215/DIG. 7, DIG. 8; 239/310, 317, 323, 239/313; 137/218, 564.5, 101.11
See application file for complete search history.

(56) References Cited

U.S. PATENT DOCUMENTS

| | | | |
|---|---|---|---|
| 2,073,273 A | 3/1937 | Wetstein | |
| 3,347,403 A | 10/1967 | Lehrman | |
| 4,221,291 A | 9/1980 | Hunt | |
| 4,315,570 A | 2/1982 | Silver | |
| 4,785,974 A | 11/1988 | Rudick et al. | |
| 5,246,139 A | 9/1993 | Duceppe | |
| 5,899,363 A | 5/1999 | Bliss, III et al. | |
| 5,919,360 A | 7/1999 | Contaxis, III et al. | |
| 5,984,141 A | 11/1999 | Gibler | |
| 5,992,690 A * | 11/1999 | Tracy | B67D 7/74 222/145.5 |

(Continued)

*Primary Examiner* — Dana Ross
*Assistant Examiner* — Ket D Dang
(74) *Attorney, Agent, or Firm* — John F. Rollins

(57) ABSTRACT

A compact filtering and additive delivery system which is readily adaptable to a portable container, such as a sports bottle, and receives a modular additive container for the metered delivery of additive, such as flavor concentrate, to a stream of base liquid as the base liquid is drawn or dispensed from the container. The modular additive container configuration on the delivery system allows a consumer/user to experience different additives, such as different flavors or supplement compositions, for a given supply of base liquid, such as water, stored in the container. The system may be readily used with off-the-shelf containers, such as disposable water bottles. An additive container configuration provides modular additive delivery system as described herein.

18 Claims, 6 Drawing Sheets

(56) References Cited

U.S. PATENT DOCUMENTS

| | | | |
|---|---|---|---|
| 6,003,728 A * | 12/1999 | Elliott | B65D 47/0804 |
| | | | 206/219 |
| 6,010,034 A | 1/2000 | Walthers | |
| 6,136,189 A | 10/2000 | Smith et al. | |
| 6,165,523 A | 12/2000 | Story | |
| 6,180,149 B1 | 1/2001 | Gramm | |
| 6,395,170 B1 * | 5/2002 | Hughes | B01D 35/02 |
| | | | 210/232 |
| 6,705,491 B1 | 3/2004 | Lizerbram et al. | |
| 6,820,740 B1 | 11/2004 | Spector | |
| 6,959,839 B2 | 11/2005 | Roth et al. | |
| 7,306,117 B2 | 12/2007 | Roth et al. | |
| 7,503,453 B2 | 3/2009 | Cronin et al. | |
| 7,568,576 B2 | 8/2009 | Sweeney, Jr. et al. | |
| 7,909,210 B2 | 3/2011 | Roth et al. | |
| 8,182,683 B1 | 5/2012 | Allen | |
| 8,230,777 B2 | 7/2012 | Anson et al. | |
| 8,302,803 B1 | 11/2012 | Greenberg et al. | |
| 8,313,644 B2 | 11/2012 | Harris et al. | |
| 8,453,833 B2 | 6/2013 | Porter | |
| 8,541,039 B2 | 9/2013 | Lackey et al. | |
| 8,590,753 B2 | 11/2013 | Marina et al. | |
| 2005/0115845 A1 * | 6/2005 | Cho | B65D 51/2878 |
| | | | 206/216 |
| 2005/0234422 A1 * | 10/2005 | Oh | B65D 51/002 |
| | | | 604/415 |
| 2008/0116221 A1 * | 5/2008 | Roth | B65D 47/243 |
| | | | 222/129 |
| 2010/0065584 A1 * | 3/2010 | Berger | A45F 3/04 |
| | | | 222/145.5 |
| 2011/0006071 A1 | 1/2011 | Koumans | |
| 2011/0089059 A1 | 4/2011 | Lane et al. | |
| 2011/0259769 A1 | 10/2011 | Salinas | |
| 2011/0290677 A1 * | 12/2011 | Simonian | B65D 51/2807 |
| | | | 206/219 |
| 2012/0000880 A1 | 1/2012 | Im | |
| 2012/0017766 A1 * | 1/2012 | Anson | B65D 47/12 |
| | | | 99/290 |
| 2012/0255973 A1 * | 10/2012 | Schlueter | B01F 5/0496 |
| | | | 222/136 |
| 2013/0008919 A1 | 1/2013 | Honan et al. | |

\* cited by examiner

ADDITIVE DELIVERY SYSTEMS AND CONTAINERS

CROSS-REFERENCE TO RELATED APPLICATIONS

This application claims the priority benefit of U.S. Provisional Patent Application Ser. No. 61/764,861 titled "BOTTLE WITH REMOVABLE FLAVOR CARTRIDGE IN WHICH FLAVOR CONCENTRATE MIXES WITH WATER AS USER DRINKS," filed on Feb. 14, 2013, the specification of which is incorporated in its entirety herein by reference.

BACKGROUND

1. Technical Field

The disclosure relates to dispensing and delivery systems for beverages and other products. More specifically, the disclosure relates to dispensing and delivery systems for providing an additive, such as flavoring or supplements, to a base liquid, such as water, as the base liquid is dispensed from a container. The disclosure also relates to containers for containing and storing an additive to be used in additive delivery systems.

2. Prior Art

The prior art includes various devices for providing additives to a base liquid. Such devices include pre-mix systems, such as those exemplified in U.S. Pat. No. 7,306,117, in which a predetermined amount of additive is dispensed into a base liquid within the container and mixed therewith prior to consumption.

Prior art systems also include additive delivery systems in which an additive is dispensed as a base fluid is dispensed from a container. Such delivery systems are exemplified by U.S. Pat. No. 8,230,777, which describes a dispensing system in which a base liquid flows through a supplement area containing solid supplements, and U.S. Pat. No. 8,413,844, which describes a water dispenser (pitcher) having a filter and an additive chamber in which the additive is dispensed as water is poured from the dispenser.

Such prior art systems, however, suffer from the drawbacks of requiring rather elaborate and relatively expensive dispensing systems and fail to combine filtration and additive delivery functionality in a manner that is readily adapted to portable, compact, portable containers, such as sports bottles. There is thus a need for additive delivery systems and additive containers that are readily adaptable to portable base liquid containers and which address the aforementioned and other needs in the art.

SUMMARY OF THE INVENTION

One aspect of the invention provides a compact filtering and additive delivery system, which is readily adaptable to a portable container, such as a sports bottle. The additive delivery system provides filtration and additive delivery to a base liquid while maintaining a generally consistent flow direction of the base liquid. The additive delivery system may receive a modular additive container selected by the user and provides for the metered delivery of additive, such as flavor concentrate, to a stream of base liquid as the base liquid is drawn or dispensed from the bottle. The modular additive container configuration on the delivery system allows a consumer/user to experience different additives, such as different flavors or supplement compositions, for a given supply of base liquid, such as water, stored in the container.

Another aspect of the invention provides a compact filtering and additive delivery system that may be used with off-the-shelf containers, such as disposable water bottles.

Yet another aspect of the invention provides a container configuration that is suitable for a modular additive delivery system as described herein.

Yet another aspect of the invention provides for uniform mixing of additive to a base liquid as the mixture is consumed, as well as a substantially uni-directional flow of base liquid and mixed additive/base liquid composition from the container.

BRIEF DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto.

DETAILED DESCRIPTION

Figure 1:
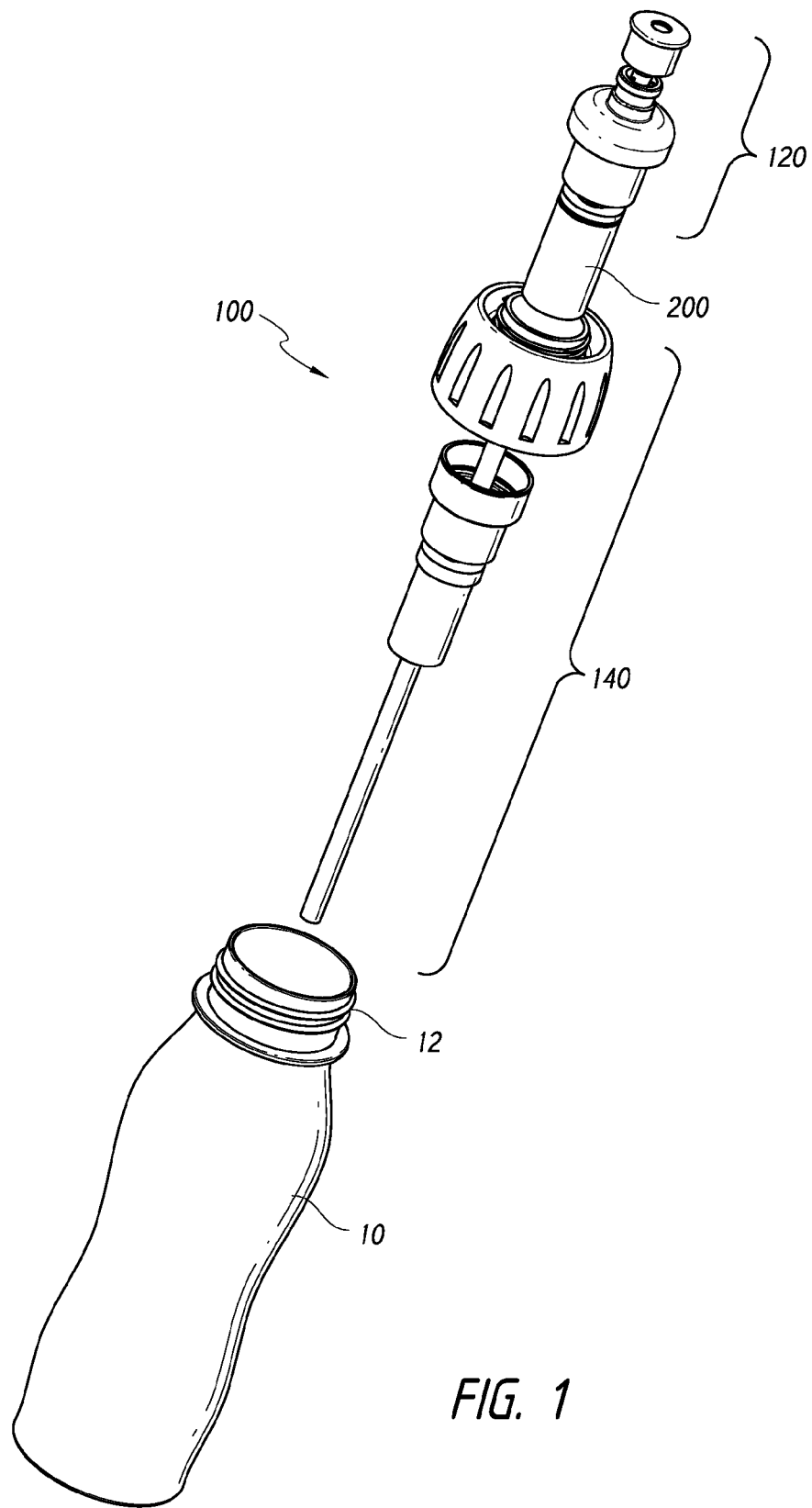
FIG. 1 is an exploded isometric view of an additive delivery system, combined with a sports bottle and filtration system according to an aspect of the invention.

Referring to FIG. 1, an additive delivery system 100 according to an aspect of the invention includes an upper cap assembly 120 and a lower cap assembly 140, in combination with a sports bottle 10. Sports bottle 10 may include an inner volume for containing a base fluid, such as water, and a threaded mouth 12 for receiving and sealingly engaging the lower cap assembly 140. As will be described in more detail below, upper cap assembly 120 and lower cap assembly 140 cooperate to house a removable additive module 200.

Figure 2:
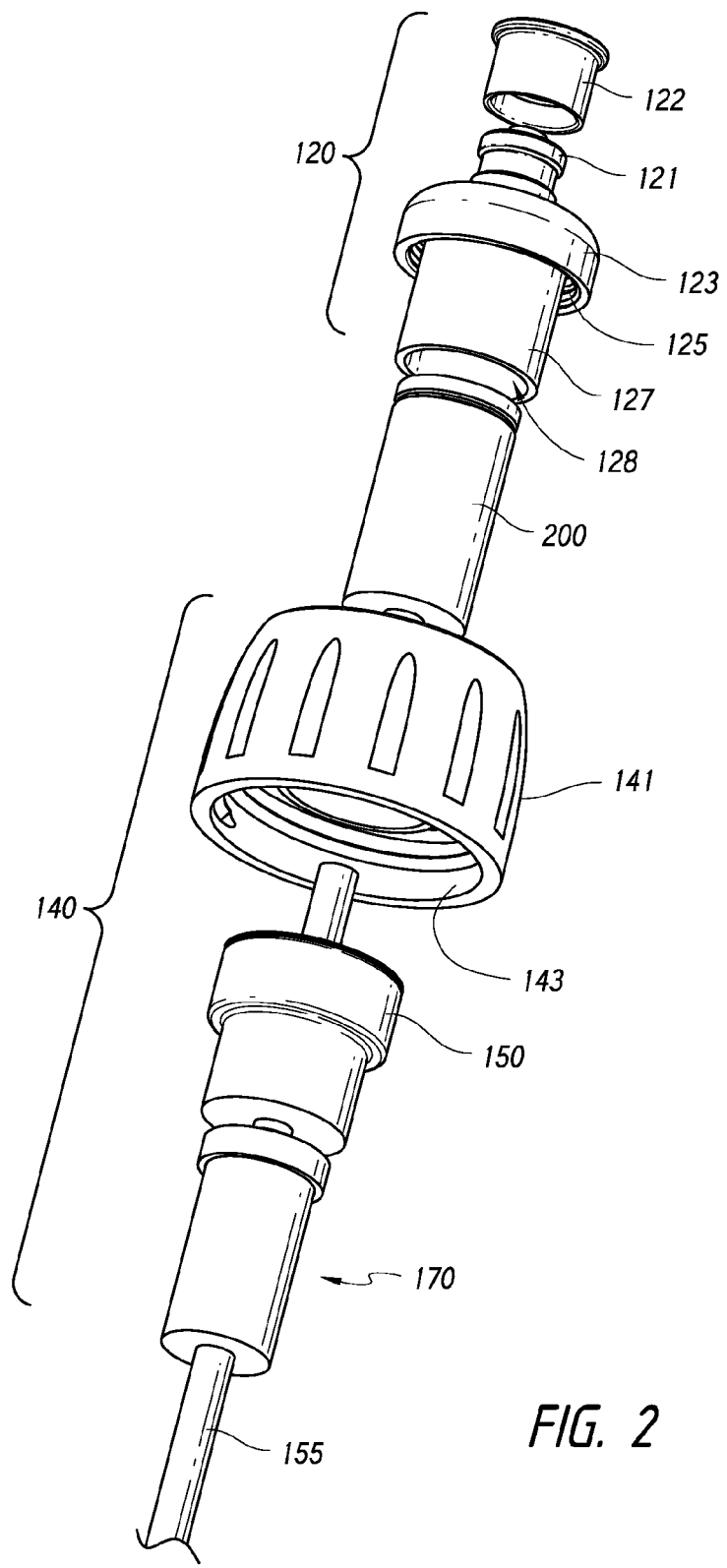
FIG. 2 is a detailed exploded isometric view of an additive delivery system according to an aspect of the invention.

Referring additionally to FIG. 2, upper cap assembly 120 may include a spout 121 and a re-sealable spout closure 122 that cooperates therewith in a known manner. Upper cap assembly may also include a cap portion 123 having threaded interior wall 125 and an additive module enclosing wall 127 defining an additive module receiving space 128 for receiving additive module 200.

Lower cap assembly 140 may include a lower cap 141 having a container engaging female threaded portion 143 and an outer surface with gripping recesses formed therein. A lower additive module enclosure 150 cooperates with the lower cap 141 and upper cap assembly 120 to house and enclose additive module 200, as will be described below. Lower cap assembly 140 may include a filter assembly 17, which houses a filter for filtering the base liquid. A delivery tube 155 extends to the bottom of the base liquid container and provides for the travel of base liquid through the filter assembly 170, lower cap assembly 140, additive module 200 and, ultimately, to spout 121, as will be described in more detail below.

Figure 3:
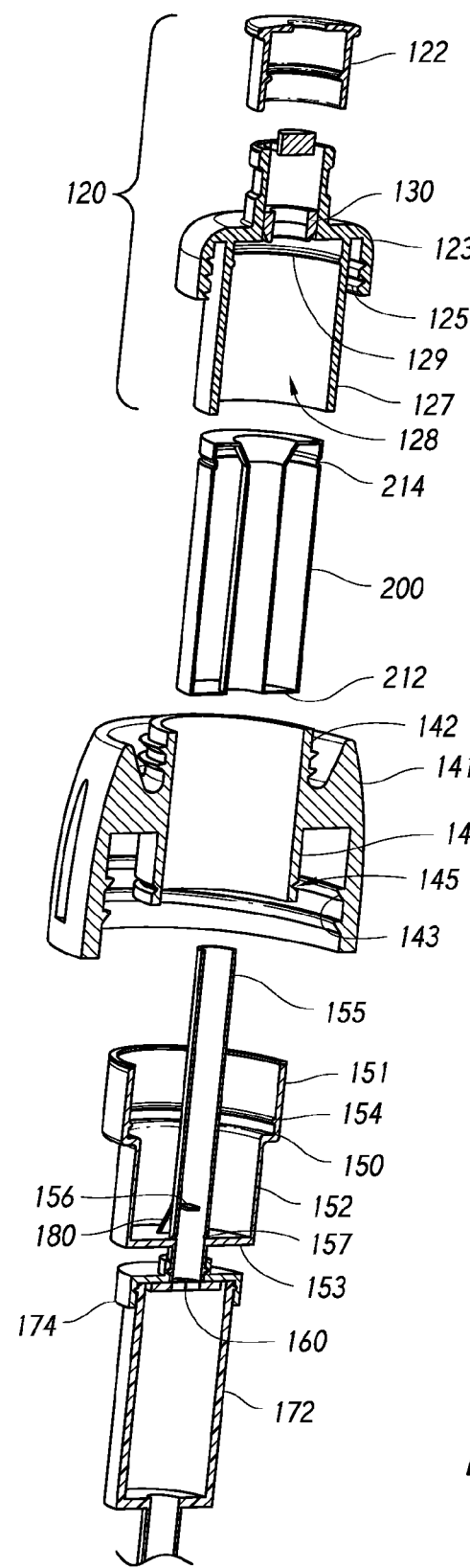
FIG. 3 is a cross-sectional exploded view of the additive delivery system of FIG. 2.

Referring additionally to the cross-sectional exploded view in FIG. 3, the additive module enclosing wall 127 of upper cap assembly 120 may include a retaining lip formed therein for engaging a retaining groove 214 on additive module 200. Lower cap assembly 140 may include an upper cap engaging male threaded portion 142 for engaging the female threads 125 on the upper cap 123. As will be recognized, this configuration allows easy removal and replacement of the additive module by the consumer as the upper cap assembly 120 may be unscrewed and removed with the additive module 200 remaining secured on the upper cap assembly 120 by way of the retaining lip 129 and retaining groove 214, which provide a snap fitting of the additive module 200 to the upper cap assembly. In addition, during removal of upper cap assembly 120, the lower cap 141 may remain secure on the container, preventing contamination or spillage of the base liquid.

According to an aspect of the invention, for safety and sanitary purposes, the additive module 200 may be provided with a transparent safety enclosure cap, which may engage the cap threads 125, and enclosed the additive module 200. In this configuration, the spout 121, spout closure 122 and safety enclosure cap (and thus the additive module, snap fit within the cap) may be sealed within a frangible thermoplastic membrane for consumer safety and product freshness. The transparent safety cap allows consumers to view the details/branding of the additive module before purchase, for example.

Lower cap 141 may also be provided with an annular wall 144 for engaging and fitting within a correspondingly-shaped upper annular wall 151 on the lower additive module enclosure assembly 150. Annular wall 144 may be provided with a retaining groove 145 for receiving a cooperating retaining lip 154 formed on the interior of upper annular wall 151 of the lower additive module enclosure assembly 150. A lower annular wall 152 and bottom wall 153 define a space for receiving a lower portion of the additive module 200. One or more additive module membrane piercing projections 180 may extend upward from the bottom wall 153 to pierce a frangible membrane 212.

Tube 155 extends upward through the lower module enclosure assembly 150 to permit flow of the base liquid. One or more metering ports 157 may be formed in the tube 155 near the bottom wall 153 to permit flow of additive concentrate from the interior of lower additive module enclosure 150 to the interior of tube 155 by venturi effect as the base liquid is drawn through tube 155. One or more mixing projections 156 may extend within the interior of tube 156 to induce turbulent flow and thereby mix the additive concentrate with the base fluid.

Filter assembly 170 may include a filter housing 172, which is snapped in place on a corresponding filter housing top 174 using a lip and groove retainer. A one-way check or flapper valve 176 formed of silicone rubber may be provided at the inlet of tube 155 from the interior of filter housing 172 to prevent backflow of the base fluid into the filter housing 172. An active carbon filter element (not shown in FIG. 3) may be provided on the interior of filter housing 172, as will be described in more detail below.

Figure 4:
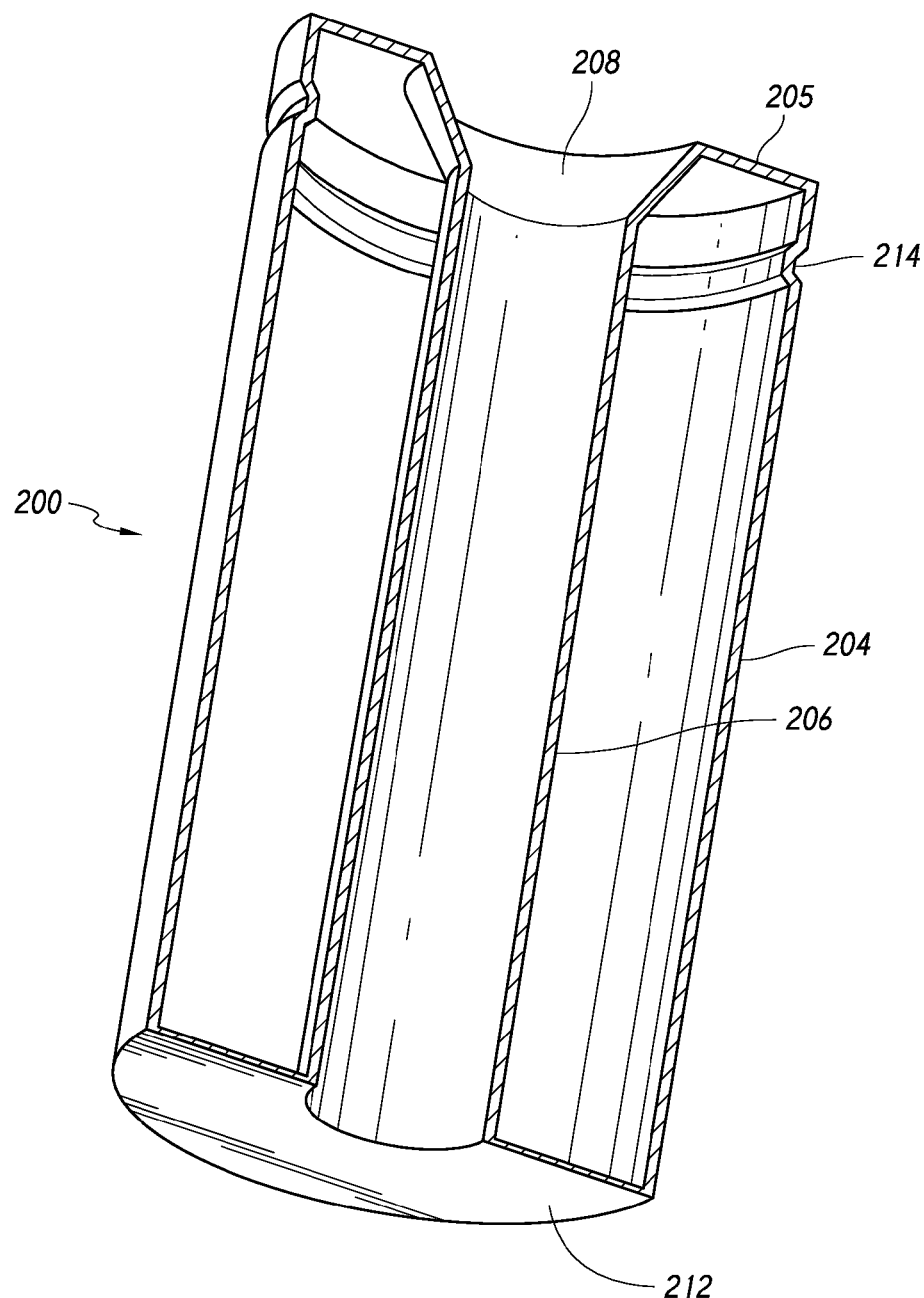
FIG. 4 is an isometric view of an additive container according to an aspect of the invention.

Referring additionally to FIG. 4, an additive module 200 according to aspects of the invention may include a generally cylindrical shape having an outer wall 204 provided with a retaining groove 214 formed therein and extending to a top wall 205 having a conical sealing surface 208. Conical surface 208 is adapted to sealingly engage a correspondingly shaped flexible seal 130 (FIG. 3), which may be made of silicone rubber or other material, and provided in upper cap assembly 120. An interior annular wall 206 defines, with upper wall 205 and outer wall 204, an interior additive containing space 210 for containing an additive, such as flavor or supplement concentrate. A frangible lower membrane 212, which may be made of foil or other material, forms a lower wall to contain and seal the additive within the module. As will be recognized, the module configuration provides for a consumer to carry and preserve a number of different additives for use with the additive delivery system and a single supply of base liquid in a container, such as a sports bottle.

Figure 5:
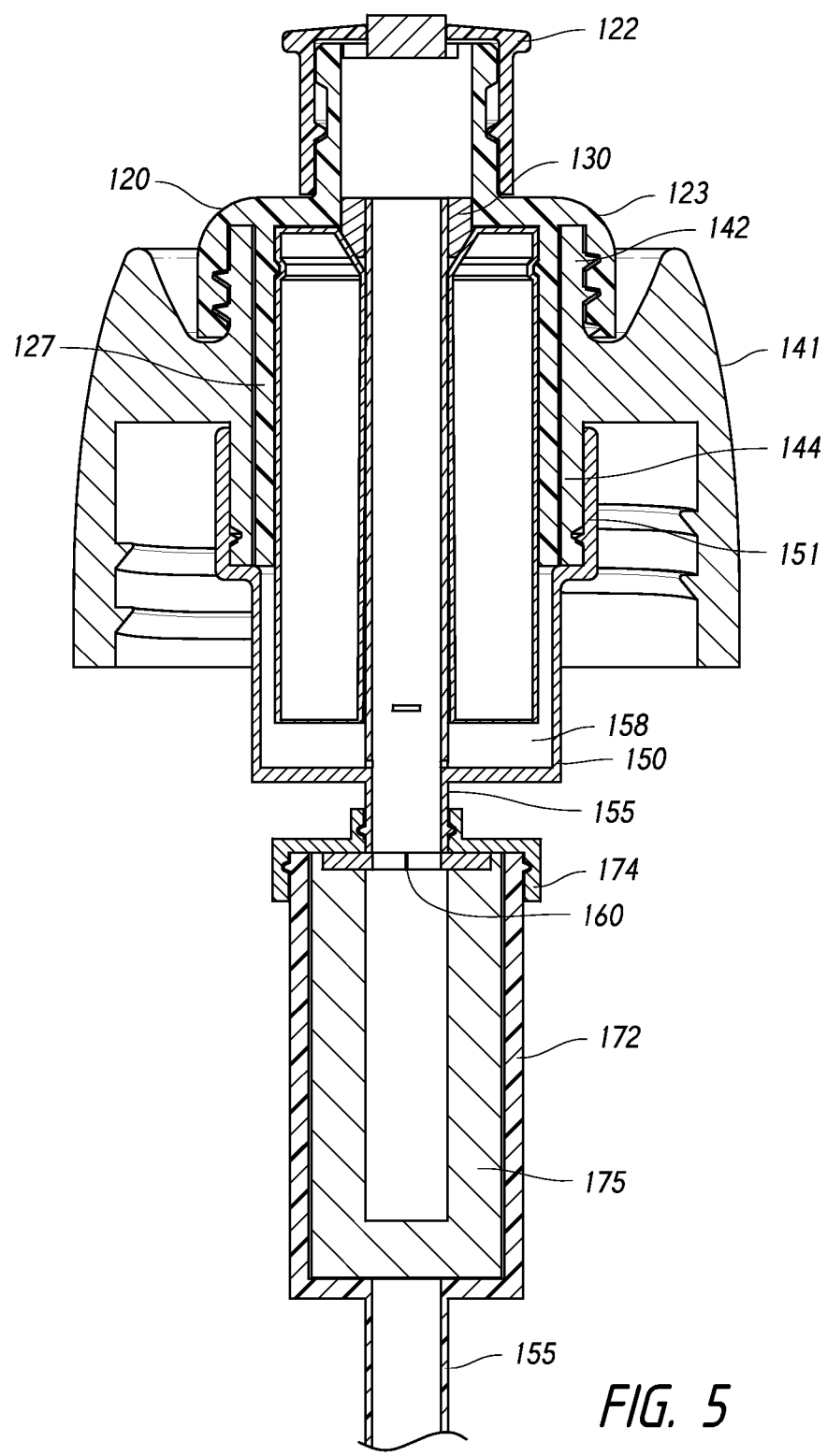
FIG. 5 is a cross-sectional view of an assembled additive delivery system according to an aspect of the invention.

FIG. 5 illustrates a cross-section of an assembled additive delivery system according to an aspect of the invention. Spout closure 122 is shown in a closed position. Upper cap 123 is shown in an engaged position (i.e., screwed on) on the male threaded portion 142 of the lower cap 141, with the additive module enclosing wall 127 of the upper cap assembly 120 extending downward into the annular opening of the lower cap 141 and securing the additive module 200 therein. The upper annular wall 151 of lower additive enclosure assembly 150 engages the module holder receiving wall 144 of the lower cap assembly 140 via lip 154 and groove 145 to provide a snap fitting. Upper cap assembly 120, lower cap assembly 140 and lower additive module enclosure assembly thereby cooperate to provide a sealed containing space for the additive module 200.

Tube 155 extends upward within the inner tube formed by inner wall 206 of additive module 200. The conical sealing surface 208 is engaged by a correspondingly shaped silicone seal 130 secured within the upper cap assembly 120. In this position, the frangible membrane 212 of additive module 200 would be pierced or ruptured by piercing projections 180 (FIG. 3) and additive concentrate stored within additive module 200 would flow into the space 158. FIG. 5 also shows a cylindrical active carbon filter element 175 housed within the filter housing 172 to filter the base fluid.

Figure 6:
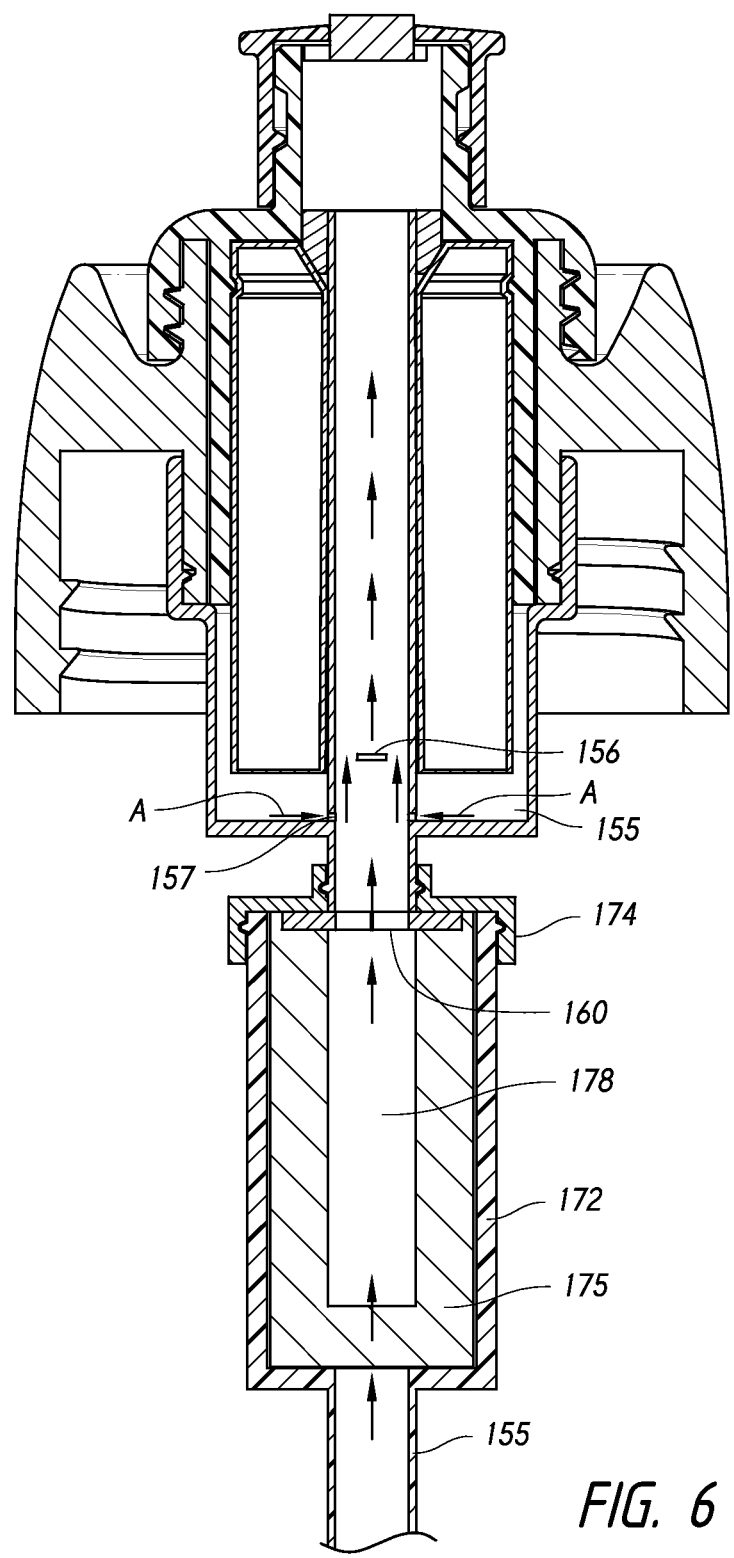
FIG. 6 is a cross-sectional view showing flow paths of an additive delivery system according to an aspect of the invention.

Referring additionally to FIG. 6, the base fluid is filtered as it flows from the lower portion of tube 155 to an interior space 178 defined by filter element 172, through the check valve 160, and upward into the upper portion of tube 155. Owing to a venturi effect, additive concentrate, represented by arrows "A" is drawn from the space 158, through metering ports 157 and into the interior of tube 155 where additive is mixed with the base fluid. Applicants have discovered that metering ports having a diameter of approximately 0.03 inches provide for suitable metering of additive liquid, while permitting the retention (non-leakage) of additive liquid from the additive module when flow of the base liquid is not occurring. As will be recognized, the diameter of metering ports may be varied depending on the viscosity of the additive liquid and other parameters such that flow occurs when needed but not when the base liquid is not flowing in the delivery tube. Mixing projection 156 enhances the mixing and uniform dilution of the additive within the base fluid. The mixed additive and base fluid composition continues up the tube 155 through the spout As will be recognized, the flow of fluid through the system may be facilitated by suction provided by the consumer or by the squeezing of the container, which may be made of a suitably flexible material, or by both. As will also be recognized, flow from the base liquid container, through the filter assembly, delivery tube and additive module is substantially in a single, linear direction, without diversion, thereby providing for efficient flow of base liquid and mixed additive/base-liquid composition from the container and providing a configuration that is particularly adaptable to a sports bottle or other compact, portable, handheld container.

As will also be recognized, the additive delivery system may be used with standard, disposable water or beverage bottles through suitable adaptation of the fastening implements on the lower cap assembly.

As will also be recognized, suitable thermoplastic polymers may be used to form the various aforementioned elements, including polyethylene terepthalate (PET), polycarbonate, high-density polyethylene (HDPE) and others.

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents that fall within the spirit and scope of the claims that follow.

What is claimed is:

1. An additive delivery system comprising:
    an upper cap portion;
    a lower cap portion cooperating with the upper cap portion to define an additive module containing space;
    an additive module removably secured to the upper cap portion, the additive module having a central interior annular wall, wherein the additive module further comprises a retaining groove and the upper cap portion includes a retaining lip cooperating with the retaining groove to removably secure the additive module to the upper cap portion;
    a delivery tube for permitting flow of a base liquid through the additive module containing space, the delivery tube extending within the central interior annular wall of the additive module, and including at least one metering port to permit flow from the additive module containing space to an interior of the delivery tube;
    whereby flow of the base liquid in the delivery tube draws additive from the additive module through the at least one metering port for mixing therewith as the base liquid flows within the delivery tube.

2. The additive delivery system of claim 1, further comprising a filtration assembly configured to filter the base liquid prior to flow into the additive module containing space, the filter assembly, the delivery tube and the additive module containing space being configured to provide for flow of the base liquid from the container through the module containing space.

3. The additive delivery system of claim 1, wherein the delivery tube is provided with at least one mixing projection to facilitate turbulent flow and mixing within the delivery tube of the base liquid and the additive.

4. The additive delivery system of claim 1, further comprising a piercing projection disposed within the additive module containing space for piercing a frangible membrane on the additive module.

5. The additive delivery system of claim 1, wherein the upper cap portion further includes a spout and an annular additive module receiving annular wall extending generally opposite the spout, the annular wall including the retaining lip for engaging the retaining groove on the addictive module to thereby secure the additive module to the upper cap portion.

6. The additive delivery system of claim 1, further comprising an additive module enclosure assembly for enclosing a lower portion of the additive module, the lower cap portion further including a downward extending annular wall having a retaining groove therein, the additive module enclosure assembly including an upper extending annular wall having a retaining lip formed therein to engage the retaining groove and thereby forming a lower additive module receiving space.

7. The additive delivery system of claim 6, wherein the the delivery tube extends through the additive enclosure assembly and the at least one metering port permits flow from the lower additive module receiving space to the interior of the delivery tube.

8. The additive delivery system of claim 7, further comprising at least one mixing projection disposed within the delivery tube.

9. The additive delivery system of claim 1, further comprising a silicone seal disposed within the upper cap portion, the silicone seal including a conical sealing surface for engaging a corresponding surface the additive module.

10. The additive delivery system of claim 1, further comprising a filtration assembly configured to filter the base liquid prior to flow into the module containing space, the filter assembly, the delivery tube and the module containing space being configured to provide for flow of the base liquid from the container through the module containing space, and further comprising a check valve for preventing backflow of the base liquid into the filtration assembly.

11. The additive delivery system of claim 10, wherein the filtration assembly includes a filter housing and a filter housing top adapted for snap fit connection to enclose a filtration element therewithin.

12. An additive delivery system comprising:
    an upper cap portion having a spout, a threaded female portion extending generally opposite the spout, and an annular additive module enclosing wall extending generally opposite the spout;
    a lower cap portion having a threaded male portion for engaging the upper cap portion threaded female portion and an additive enclosure assembly retaining wall extending generally opposite the threaded male portion;
    an additive enclosure assembly including an annular wall cooperating with the additive enclosure assembly retaining wall to form a lower additive module receiving space;
    the additive enclosure assembly further including a delivery tube extending therethrough and having at least one metering port for permitting flow from the lower additive module receiving space to an interior of the delivery tube,
    the additive enclosure assembly further including at least one piercing projection extending into the lower additive module receiving space for piercing a frangible membrane on an additive module; the delivery tube including at least one mixing projection extending within the interior of the delivery tube;
    whereby flow of a base liquid in the delivery tube draws additive through the at least one metering port for mixing therewith as the base liquid flows within the delivery tube.

13. An additive delivery system for mixing an additive with a base fluid as the base fluid is dispensed from a container, the system comprising:
    an additive module for containing a supply of additive;
    an upper cap portion having an annular wall for releasably engaging the additive module, wherein the additive module is releasably engaged to the upper cap portion with a snap fitting, the upper cap portion including a spout for permitting flow of fluid from the additive delivery system;

a lower cap portion cooperating with the upper cap portion to secure the additive module to the upper cap portion;

a first flow path defined in the lower cap portion for permitting flow of a base liquid through the lower cap portion, through the additive module and through the spout;

a second flow path defined in the lower cap portion for permitting flow of additive from the additive module to the first flow path and including a metering port to meter the flow of additive into the first flow path;

whereby flow of the base liquid in the first flow path draws additive through the at least one metering port for mixing therewith as the base liquid flows within the first flow path.

14. The additive delivery system of claim 13, further comprising a filtration assembly configured to filter the base liquid prior to flow into a module containing space and further comprising a check valve for preventing backflow of the base liquid into the filtration assembly, wherein the filtration assembly includes a filter housing and a filter housing top adapted for snap fit connection to enclose a filtration element therewithin.

15. The additive delivery system of claim 13, wherein the first flow path is defined at least in part by a delivery tube extending concentrically with the upper cap portion and through the additive module.

16. The additive delivery system of claim 13, wherein the first flow path is defined at least in part by a delivery tube extending concentrically with the upper cap portion and through the additive module, and where in the second flow path is defined at least in part by the metering port in the delivery tube.

17. The additive delivery system of claim 13, wherein the additive module is cylindrical in shape and includes an inner annular wall.

18. The additive delivery system of claim 13, wherein the additive module includes a conical sealing surface.

* * * * *